UNITED STATES PATENT OFFICE.

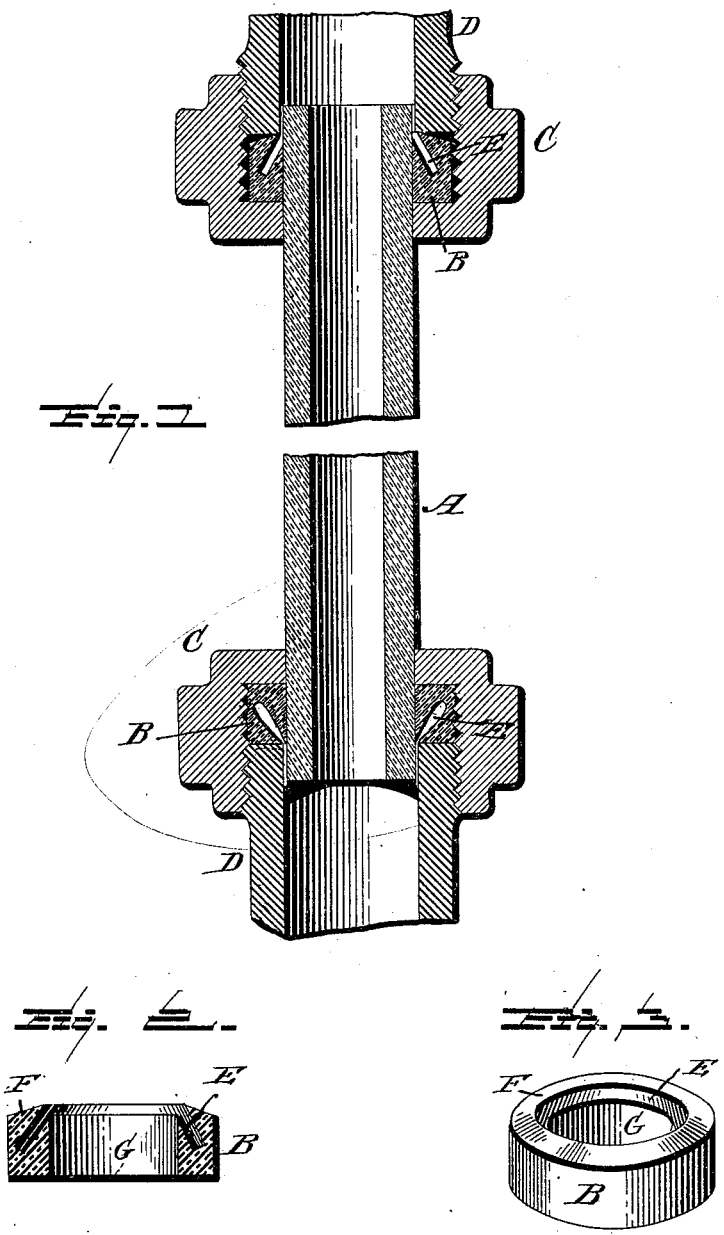

EDWARD L. PERRY, JR., OF PATERSON, NEW JERSEY.

GAGE-GLASS PACKING.

SPECIFICATION forming part of Letters Patent No. 631,661, dated August 22, 1899.

Application filed April 13, 1899. Serial No. 712,869. (No model.)

*To all whom it may concern:*

Be it known that I, EDWARD L. PERRY, Jr., a citizen of the United States, residing at Paterson, in the county of Passaic and State of New Jersey, have invented certain new and useful Improvements in Gage-Glass Packing; and I do hereby declare that the following is a full, clear, and exact description of the same, reference being had to the annexed drawings, making a part of this specification, and to the the letters of reference marked thereon.

The present invention has relation to certain new and useful improvements in the rubber or other elastic packing used upon the ends of gage-glasses where they connect with the usual screw-cap and coupling.

Previous to my invention the usual manner of packing glass water-gages consisted in a simple rubber or other elastic ring, and while this custom had been in use by engineers generally there have been many devices offered for improvement on account of the great loss incident to the breakage of the glass gage-tube, which in most instances is due either to the careless manner in packing the glass tube by screwing up the screw cap or nut tightly or the glass being out of plumb, either of which causes rendering the tube liable to break when under high pressure and heated to a high temperature.

My invention consists of an elastic packing preferably in form of a ring or washer and of such construction as will avoid the possibility of breakage of the glass gage-tube, as will be hereinafter described and claimed.

Figure 1 of the drawings is a sectional elevation of a gage-glass with its screw cap or nut and coupling at its ends and showing my improved packing applied thereto; Fig. 2, a sectional elevation of the elastic packing, on an enlarged scale, showing the expansion-chamber therein; Fig. 3, a perspective view thereof.

In the accompanying drawings, A represents the ordinary glass tube of a steam-gage, and B the rubber or other elastic packing which is held between the screw cap or nut C and the end of the coupling D, which screw cap or nut and coupling are of ordinary construction and connect with each other by screw-threads thereon in the usual manner.

The packing B, which constitutes my invention, is preferably in the form of a ring or washer and is composed of rubber or other elastic material with a circumferential expansion-chamber E upon the side of the packing having the circumferential bevel F. This bevel admits of the packing being compressed to partially close the open end of the chamber, the packing upon the upper and lower end of the gage-glass showing the expansion-chamber before and after being compressed, respectively. This chamber E allows the pressure of water or steam to enter and expand the packing, so as to fill and tightly pack the gland.

In the construction of an elastic packing for gage-glasses it must of necessity fill certain requirements, and in order that the same may pack both on the inner and outer sides at the proper point it is necessary to have as large a body of gum or elastic material from which the packing is composed as possible, both on the inner side at the bottom and on the outer side at the top of said packing. Therefore in order to secure this body of gum or elastic material at both top and bottom on the outer and inner sides, respectively, the circumferential expansion-chamber E is made of the same diameter throughout its depth and extending on an incline in a direction toward the central opening of the packing with which the chamber joins. This inclination of the expansion-chamber, as will be seen, leaves an excess of material at the outer end and side of the packing and at the inner end and inner side thereof.

The beveled edge F of the packing is also an important feature of the invention, as the inner edge of this bevel is on a higher plane than the outer edge, thus forming a joint or connection with the metal coupling D before the nut or cap C is tightened, thereby acting as a guide to lead the water or steam into the expansion-chamber E and preventing it from escaping to the outer side of the packing, in which case the packing would be prevented from performing its work properly. It will therefore be seen that both the inclined expansion-chamber and the bevel upon the outer edge of the packing are two essential features of the invention, and without them a packing would be useless when applied to a gage-glass.

Without exerting an undue pressure on the end of the glass tube the nut or cap can be screwed down simply by the use of the forefinger and thumb, dispensing entirely with the use of a wrench, which in many cases is the cause of breakage and trouble, the glass tube when used in connection with my improved packing being capable of ready removal for the purpose of cleaning and returned to its place without danger of breaking.

Having now fully described my invention, what I claim as new, and desire to secure by Letters Patent, is—

An elastic packing for gage-glasses, said packing consisting of a ring of elastic material having parallel outer and inner sides and one end flat and the other outwardly inclined, and having a circumferential expansion-chamber extending from the meeting edge of said inner side and inclined end, and at an inclination to both, substantially as described.

In testimony that I claim the above, I have hereunto subscribed my name in the presence of two witnesses.

EDWARD L. PERRY, Jr.

Witnesses:
    CHAS. B. WILLIAMS,
    FRANK G. LOZIER.